United States Patent Office 3,541,221
Patented Nov. 17, 1970

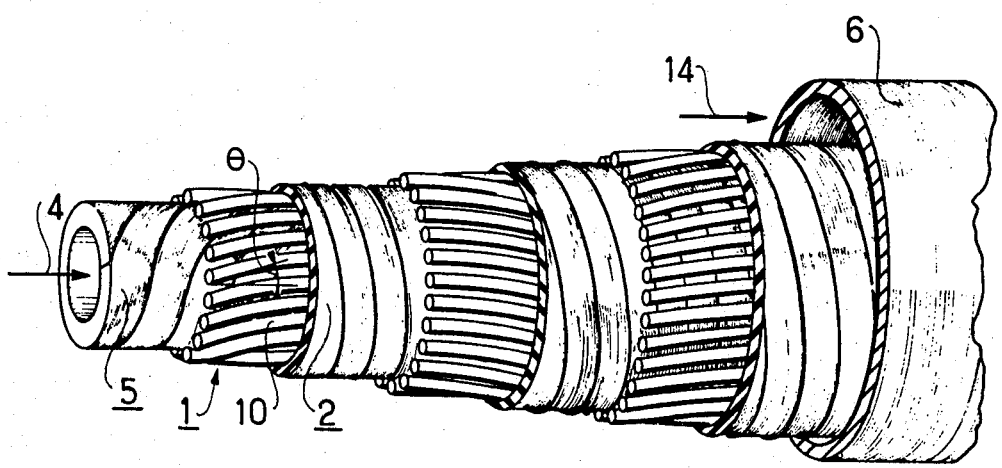

3,541,221
ELECTRIC CABLE WHOSE LENGTH DOES NOT VARY AS A FUNCTION OF TEMPERATURE
Marcel Aupoix, Paris, and François Moisson-Franckhauser, Bretigny-sur-Orge, France, assignors to Compagnie Generale d'Electricite, Paris, France, a corporation of France
Filed Dec. 10, 1968, Ser. No. 782,558
Claims priority, application France, Dec. 11, 1967, 131,779
Int. Cl. H01b 7/34, 7/06
U.S. Cl. 174—13
6 Claims

ABSTRACT OF THE DISCLOSURE

An electric cable of nonvarying length regardless of change in temperature formed by at least two concentric layers, one of which is of conducting metal, the other being of insulating material, and in which the conducting metal layer consist of helically-coiled wires disposed at a given angle with respect to the cable axis.

BACKGROUND OF THE INVENTION

Field of the invention

The present invention relates to an electric cable construction which is intended to carry a direct current or an alternating current (single-phase or polyphase) at an operating temperature which is either above ambient temperature (application to cables having conventional electrical conductivity) or below ambient temperature (application to hyperconducting or superconducting cables).

Description of the prior art

It is known that in an electric cable consisting of a number of layers of conductors separated from one another by layers of insulating material, the electric conductors of great length, which are brought from ambient temperature to their rated temperature, undergo considerable mechanical stresses owing to the expansions (case of conventional conductors) or contractions (case of hyperconducting or superconducting conductors) which they undergo.

For example, an aluminum conductor tends to contract by 0.42% when its temperature changes from ambient temperature to an operating temperature in the neighborhood of 20° K. Since this contraction may occur in a conductor of considerable length, the stresses thus created result in a considerable longitudinal plastic deformation of the material (the elastic limit at 20° K corresponding to a relative elongation of 0.5% accompanying a stress of 3.4 kg./mm.², so that the plastic deformation produced in this case reaches eight times the elastic limit).

The disadvantages to be avoided which accompany the thermal expansion or contraction are:

(a) the reactions on the anchorings of the cable;
(b) the mechanical disadvantages attendant upon the use of the material in the plastic deformation range (fatigue of the material, cold working, premature wear and breakage);
(c) in the case of hyperconductive materials, increase of the resistivity accompanying the cold working of the material;
(d) in the case of concentric conductors and insulators, the forces due to the differences in the radial thermal contractions of these elements.

SUMMARY OF THE INVENTION

The present invention concerns an electric cable consisting of at least two concentric layers, one of conductive metal and the other of wound strip-form insulating material. The conductor is disposed in the general form of at least one helix, an insulating sheathing element contacts the helix, and the ratio of the expansion or contraction coefficients of the conductor and of the insulator are so chosen that the sheathing exerts a pressure on the aforesaid helix under the effect of a change of temperature, to produce an elongation or contraction which compensates for the effect of the change of temperature.

In accordance with an advantageous feature, the layer of conductive metal is formed of metal wires disposed in the form of helices around a cylindrical surface and coiled with an angle $\theta$ whose value is substantially equal to arc sin $\sqrt{k}$, $k$ being the ratio of the contraction coefficient of the metal to that of the insulating material.

In a preferred embodiment, the conductive layer consists of wires in the form of helices slightly spaced apart so as to obtain a cable of constant length when the cable is cooled, owing to a simultaneous variation of the winding angle and of the diameter of the helices.

An advantage of the present invention resides in the fact that, when the temperature of the cable is changed, the diameter variations of a conductive sheet imparted by that of the neighboring insulating sheet result in a variation $d\theta$ of the winding angle of the conductive wires, which does not result in any modification in the length of the cable, which is not subjected to any longitudinal tensile force.

BRIEF DESCRIPTION OF THE DRAWINGS

The single figure illustrates a portion of a cable comprising a number of concentric layers of conductors and insulators according to the invention.

DESCRIPTION OF THE PREFERRED EMBODIMENT

In the figure, the cable, which is particularly intended to carry a polyphase current, comprises a plurality of conductive layers such as 1 separated from one another by an insulating layer 2. (For example, a layer 1 is provided for each of the phases of the currents; in a variant, a number of layers per phase are possible.) Each of the conductive layers 1 is formed of noncontiguous metal wires 10 wound with the same angle $\theta$=arc sin $\sqrt{k}$ in relation to the axis of the cable, $k$ being the ratio of the contraction coefficient of the conductive metal of the wires 10 to that of the insulating material of the insulating layers such as 2. The core of the cable consists of a mandrel 5 of insulating material cut into the form of a helix. Each insulating layer 2 is preferably formed by paper tape or insulating material wound with semi-overlapping turns.

By way of nonlimiting example, the conductive layers consist of an aluminum wire whose winding angle $\theta$ in relation to the axis of the cable is in the neighborhood of 25°, and have between the temperatures of 300° and 20° Kelvin a contraction of 0.42% compatible with the use of a sheet of wound insulating strip whose contraction is 2%.

Thus, on a change in temperature, the diameter of the insulating sheets varies and brings about a variation of the diameter of the conductive sheets, which results in a variation $d\theta$ of the winding angle.

Since the conductive sheets of the cable are so formed as to leave a slight spacing between the conductive wires, this spacing is reduced on cooling as a result of the simultaneous variation of the winding angle and of the diameter of the helices.

Since the insulation is in the form of a wound strip, the longitudinal slip of the insulating strips one upon the other takes places without producing any stresses in this insulation, so that there is no slipping of the conductive layers in relation to the insulating layer.

Hence, in such cables, the length of the cable remains unchanged when it is brought from ambient temperature to its rated operating temperature, without the cable being subjected to any longitudinal tensile forces. Thus, this cable need not be anchored at its ends.

In the case of a superconducting cable, the wires 1 consist, for example, of aluminum having a high degree of purity or of refined copper, to the surface of which there is applied, by any known method, a deposit of superconductive material such as lead, niobium or a niobium-zirconium, titanium-niobium or niobium-tin alloy. The conductive wires 1 are helically coiled.

Disposed above the conductive layers, and in contact with the deposit of superconductive material, are insulating layers 2 preferably formed by winding on strips of paper or insulating plastics with semioverlapping turns.

Each of the conductive layers consists of helically coiled wires which are at an angle 0 to the axis of the cable, such that $\theta = \arc \sin\sqrt{k}$, $k$ being the ratio of the contraction coefficient of the conductive metal to that of the insulating material, and the pitch of the metal wires being reversed in each successive conductive layer.

The cable thus formed is disposed in a cylindrical cryogenic chamber 6, it being possible for a cryogenic fluid such as liquid or gaseous helium to flow in the direction of the arrow 14 through the space between the insulating layer of largest diameter and the chamber 6, and in the direction of the arrow 4 through the cylindrical volume defined by the core 5 of the cable, so that the helium contributes with the insulating layers to the maintenance of the tension of the conductive layers.

Owing to the helical construction of the layers of conductive wires, the cable according to the invention has the feature of retaining a constant length in the event of a temperature change, owing to the variations in the diameter of the insulating layers and of the conductive layers, which results in a variation of the winding angle of the conductive wires.

In addition, since the insulating layers are wound in strip form, the longitudinal slip of the insulating strips one upon the other takes place without creating any stresses in the insulation, so that there is no slipping between the insulating layers and the conductive layers, the behavior of the cable thus being unaffected by coefficients of friction between the conductive and insulating layers.

Although only a three-phase cable has been described in detail, it is to be understood that the invention includes cables for direct current or polyphase alternating current. The person skilled in the art will be able to choose the number of conductive and insulating layers necessary in each particular case.

The ivention is also applicable to superconductiing cables. The conductive layers will consist of very pure aluminum or copper, or of metal having an electrical conductivity of the same order of magnitude and the conventional cooled cables.

While the invention has been particularly shown and described with reference to a preferred embodiment thereof, it will be understood by those skilled in the art that various changes in form and details may be made therein without departing from the spirit and scope of the invention.

What is claimed is:

1. An electric cable including at least two concentric layers of conductive metal and of wound strip-form insulating material, the improvement wherein: the conductor is disposed in the general form of at least one helix with at least one insulating sheathing element being disposed thereagainst, and wherein the ratio of the expansion or contraction coefficients of the conductor and of the insulator are so chosen that said sheathing exerts a pressure on said helix under the effect of a change of temperature to produce an elongation or contraction which compensates for the effect of the change of temperature.

2. The electric cable as claimed in claim 1, wherein: each layer of conductive metal is formed of metal wires disposed in the form of helices around a cylindrical surface and wound with an angle $\theta$ whose value is substantially equal to $\arc \sin \sqrt{k}$ in relation to the axis of the cable, wherein $k$ is the ratio of the contraction coefficient of the conductive metal to that of the insulating material.

3. The electric cable as claimed in claim 1, wherein: each conductive layer consists of wires in the form of helices spaced slightly apart to maintain the length of the cable upon a change of temperature due to the simultaneous variation of the winding angle and of the diameter of the helices.

4. The electric cable as claimed in claim 1, wherein: the wires constituting each conductive layer comprise a metal chosen from the group consisting of aluminum of a high degree of purity, refined copper, silver or beryllium.

5. The electric cable as claimed in claim 1, wherein: each conductive layer comprises in part, a superconductive material of the group of lead, niobium, niobium-zirconium alloy, niobium-titanium alloy and niobium-tin alloy.

6. The electric cable as claimed in claim 1, further comprising: a central insulating core serving as a channel for cryogenic fluid and supporting said coaxially disposed conductive and insulating layers thereon.

References Cited

UNITED STATES PATENTS

| | | | |
|---|---|---|---|
| 2,531,917 | 11/1950 | Mollerhon et al. | 174—13 |
| 3,413,408 | 11/1968 | Robinson | 174—105 |

LEWIS H. MYERS, Primary Examiner

A. T. GRIMLEY, Assistant Examiner

U.S. Cl. X.R.

174—15, 28, 105, 108